Dec. 25, 1956     J. L. DOUGLASS     2,775,471
TUBE COUPLING WITH SEALED CONICAL INTERFACE
Filed Nov. 23, 1949

INVENTOR
James L. Douglass
BY Evans + McCoy
ATTORNEYS

United States Patent Office 2,775,471
Patented Dec. 25, 1956

2,775,471

TUBE COUPLING WITH SEALED CONICAL INTERFACE

James L. Douglass, Cleveland Heights, Ohio, assignor, by mesne assignments, to The Special Screw Products Company, a corporation of Ohio Application November 23, 1949, Serial No. 128,973

9 Claims. (Cl. 285—332)

This invention relates to tube couplings or fittings and particularly to couplings for metal tubes to which other tubes or conduits are to be connected in the construction of lines for carrying fluids with relatively high pressures.

It has heretofore been proposed to provide couplings for attaching adjacent ends of metal tubes to each other and attaching metal tubes to other fittings by squeezing a flared end of a tube between conical sealing surfaces, one of which is adapted to contact the inner surface of the flared end of the tube. A coupling of this type is disclosed and claimed in my prior U. S. Patent No. 2,310,944. It has also been proposed to employ gasket rings between the inner flared surface of the tube and the adjacent conical sealing surface of the coupling unit. However, such gaskets have been relatively ineffective for improving the sealing action of the coupling. Either the gaskets were made of substantially incompressible material that prevented the desired metal-to-metal contact, or they were made of compressible materials having insufficient rigidity to contribute to the effectiveness of the seal.

It is an object of the present invention to provide an improved coupling in which a gasket is employed so as to improve the sealing action compared to what has been obtainable with prior art fittings that rely entirely upon metal-to-metal contact, such as fittings of the type disclosed in my above mentioned patent and compared with similar prior art fittings in which gasket rings have been employed.

It is another object of the invention to provide couplings of the character described in which the gaskets are more resistant to severe service conditions such as high pressures, high temperatures, contact with corrosive fluids, etc.

Other objects and advantages of the invention will be apparent from the following description of illustrative embodiments of the invention as shown in the accompanying drawing in which.

Figure 1:
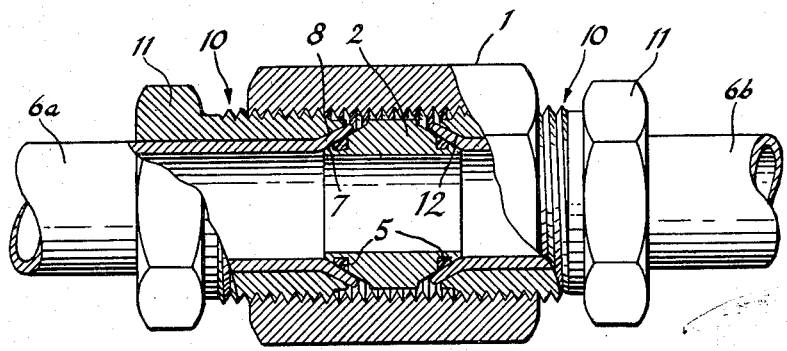
Figure 1 is a view, partly in longitudinal section, showing the invention employed for joining the adjacent ends of two sections of tubing.
Figure 2:
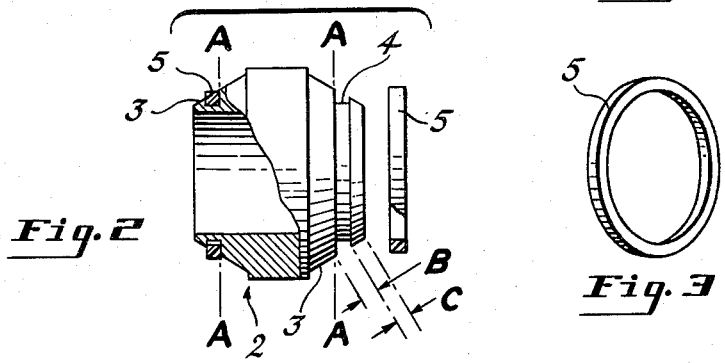
Fig. 2 is an exploded view, partly in longitudinal section, of the mandrel or insert member of Fig. 1 and including the gaskets associated therewith.
Figure 3:
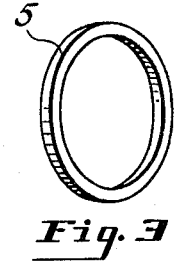
Fig. 3 is a perspective view of one of the gaskets.

Referring first to Figs. 1 to 4, the assembled coupling comprises an external, cylindrical body 1 that may be exteriorly shaped to receive and be turned with a wrench and is internally threaded from end to end to provide oppositely directed tube receiving openings. Inside the external body 1, and approximately midway between its ends in the assembled coupling, is a hollow mandrel or insert member 2 that is preferably symmetrical on opposite sides of a transverse median plane.

The opposite ends of the mandrel 2 are identically tapered to provide frusto-conical pressure surfaces 3, and a circumferential groove 4 is cut into each of these conical surfaces to receive annular gaskets 5. The grooves 4 are preferably trapezoidal in cross-section, having parallel side walls that are normal to the longitudinal axis of the mandrel. For reasons hereinafter explained, the grooves 4 are cut into the tapered surfaces 3 toward the small ends of those surfaces from planes A—A that pass through their longitudinal centers. Also, the proportions of the grooves with respect to the lengths of the conical surfaces, are such that the widths of the grooves (dimension B) are approximately equal to their distances from the small ends of the tapered surfaces 3 (dimension C).

The gasket rings are made of a substantially incompressible but deformable material that is highly inert chemically over a wide temperature range and that retains its deformability over a wide temperature range. An ideal material is polymerized tetrafluoroethylene sold by E. I. du Pont de Nemours and Company under the name "Teflon" and obtainable in a variety of physical shapes. If care is taken to reduce porosity to a minimum, natural and synthetic rubbers may be used, though they are inferior to "Teflon."

I prefer, for convenience, to cut the gaskets as slices from long tubes of the required inside and outside diameter. In this manner, all waste is avoided. While the cross-sectional shape of the gaskets is relatively unimportant, a rectangular form is very satisfactory and is easily made in the manner indicated. The total volume of the gaskets, however, is important and rather critical in relation to the volume of the grooves 4. The volume of the gaskets should exceed that of the grooves by more than any very slight thermal contraction of the gasket material that might result as low operating temperatures, but should not exceed 110% of the volume of the grooves. In practice, the gasket volume should not be less than 102% of the volume of the grooves. For most non-porous solid materials, compressibility is negligible and may be ignored. Any slight porosity, however, will produce an effective compressibility that will permit the entire volume of the gasket material to be compressed into the grooves 4. This is to be avoided, and the term "incompressible" as used herein and in the appended claims has reference to the effective compressibility, which may be largely due to porosity.

In order that the gasket may be slipped over the small end of the mandrel and not fall off again while the mandrel is being handled, the internal diameter of the gasket should be less than the outside diameter of the groove at its shallow side. When using gasket materials having little elasticity, however, the internal diameter of the gasket can be only slightly less than that of the shoulder over which it must be stretched, and thus somewhat greater than the inner diameter of the groove, as shown at the left hand side of Fig. 3. This condition must be taken into consideration in determining the volume of the gasket, for the relative cross-sectional areas of the gasket and its groove are not necessarily the same as their relative volumes.

The adjacent ends of tubes 6a and 6b to be coupled are flared as shown to provide inner and outer frusto-conical surfaces 7 and 8 having approximately the same degree of taper as the frusto-conical surfaces 3 of the mandrel. Because the metal of the tube is necessarily thinned somewhat where it is stretched during the flaring operation, the flared tube surfaces 7 and 8 do not have exactly the same degree of taper. It is desirable that the outer surface 8, rather than the inner surface 7, of the tube have the same degree of taper as the conical surface 3 of the mandrel, for reasons hereinafter explained. However, slight inaccuracies in the flaring of the ends of the tubes 6a and 6b are generally not serious and are corrected in tightening the coupling.

Before the ends of the tubes 6a and 6b are flared, identical elongated pressure nuts 10 are slipped over the tubes. These nuts 10 have flanges 11 shaped to receive and be turned with a wrench, and their body portions are exteriorly threaded to fit the internal threads of the external coupling body 1. The threaded ends of the pressure nuts 10 are internally flared to provide frusto-conical surfaces 12 having the same degree of taper as the surfaces 3 of the mandrel. The axial length of the surfaces 12 is preferably only about half of the axial length of the conical surfaces 3 of the mandrel.

When the pressure nuts 10 are screwed into the opposite ends of the external coupling body 1, the flared ends of the tubes 6a and 6b are respectively clamped in metal-to-metal contact with the surrounding pressure nut surfaces 12 and the small ends of the conical mandrel surfaces 3. In addition, the gaskets 5 engage the inner flared surfaces of the tubes. The circumferential pressure on the gaskets 5 squeezes them into their respective grooves 4. By reason of the deformability of the gasket material, it completely fills the grooves 4, and the 2 to 10% excess volume of the gasket material forms very slight annular protuberances. Because of the incompressibility of the gasket material, these protuberances are capable of unyieldingly withstanding a very great pressure. As the pressure nut 10 is screwed tighter into the external body 1, therefore, a high sealing pressure is created between the gaskets and the inner conical surfaces 7 of the tube ends.

Figure 4:
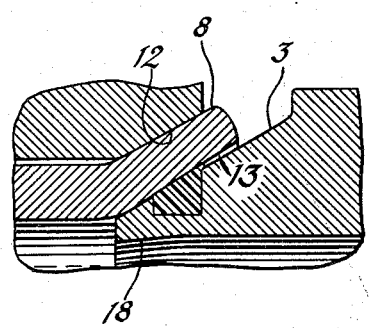
Fig. 4 is an enlarged fragmentary sectional view showing details of the joint between the coupling unit and one of the tubes.

The very slight taper in the wall thickness of the flared tube ends may permit a very slight annular space 13 to exist between the inner flared surface 7 of the tube and the inner half of the conical surface of the mandrel, as shown with considerable exaggeration in Fig. 4. This space, however, is so slight that there is little opportunity for any of the gasket material to flow into it if the preferred proportions of the parts are maintained. If the volume of the gaskets 5 approaches about 110% of the volume of the grooves 4, enough of the gasket material may occasionally flow into this space to form an extremely thin conical burr that can be detected when the coupling is disassembled. The spaces 13 are so thin, however, that there is great resistance to continued flow therethrough, and the pressure on the relatively stiff gasket material remains far greater than any elastic pressure obtainable with known gasket materials.

From the foregoing, it will be seen that the invention provides metal-to-metal sealing pressure on each joint outwardly of the gasket rings and also a substantially equal metal-to-gasket sealing pressure. This metal-to-gasket sealing pressure is substantially greater than has been obtainable with similar prior art couplings embodying gasket seals, and substantially greater freedom from leakage at high pressure results.

Figure 5:
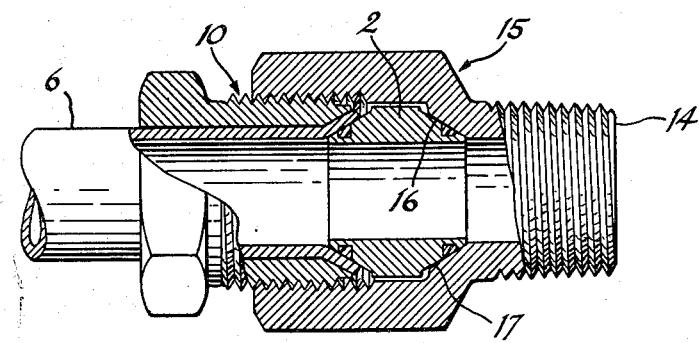
Fig. 5 is a view similar to Fig. 1 but showing a modified form of the invention for joining one end of a single tube to other apparatus.

In Fig. 5 is shown a modified form of coupling that is adapted to receive the flared end of a single tube 6 at one end of the coupling and is provided with any conventional threaded fitting at its opposite end, such as the externally threaded hollow boss 14 on a modified external body 15. The joint with the flared tube 6 is the same as the two joints shown in Fig. 1. However, the opposite end of the mandrel 2, which is the same as the mandrel in Figs. 1 and 2, has its conical surface abutting an internal conical surface 16 of the modified external body 15. To produce the same gasket-to-metal sealing effect as in the joint with the flared tube, the internal pressure surface of the body 1 may be very slightly relieved inwardly of the gasket, in the region designated 17, to provide an almost infinitesimal clearance similar to 13 (Fig. 4) in the tube joint.

The coupling elements of the present invention are especially suited for joining stainless steel tubing in chemical, food processing, and medicinal plants and the like where corrosive conditions or sanitary requirements demand the use of such materials. For such uses, of course, the metal fitting elements are also made of stainless steel. The hardness and rigidity of stainless steel tubes, compared to copper or aluminum tubes, for example, results in the metal of the tubes being relatively resistant to plastic deformation as the coupling is tightened. This condition not only calls for accurate machining of the parts of the coupling, but also makes it even more necessary that an effective, plastic, gasket-to-metal seal be provided, the deformable gasket material being called upon in this case to perform an essential, rather than merely supplementary, sealing function. Only by reason of the high gasket pressures which the invention provides does this become feasible.

Because the outer flared surface of the tube is backed up by the pressure nut 10 and the metal of stainless steel tubes is so resistant to plastic deformation, there can be substantially no outwardly yielding of the pressure nut or flow of the metal in the tube to accommodate any slight irregularities in the thickness of the tube. By keeping the gasket relatively close to the small end of the mandrel, the mandrel thickness is at a minimum where the metal-to-metal contact occurs and the pressures are greatest. Thus, the small end of the mandrel itself is capable of being inwardly deformed to the slight extent necessary to accommodate slight variance in tube thickness from one point to another about its circumference. This is illustrated with exaggeration at 18 in Fig. 4. If the gasket volume exceeds about 110% of the groove volume, the strain on this section of the mandrel tends to become excessive and may fracture it; and overtightening the coupling is likely also to cause failures at this point. However, the effectiveness of this gasket-to-metal seal is attested by the fact that a coupling such as that shown in Fig. 1, for ½ inch O. D. tubing, can be tightened by hand without the aid of wrenches sufficiently to hold a pressure of 4,000 lbs. per sq. in. Accordingly, the coupling need not be subjected to large wrench torques to insure a reliable joint.

Having described my invention, I claim:

1. A conduit coupling assembly comprising a first tubular member having an inwardly frusto-conical surface adjacent an open end thereof that flares outwardly toward said open end, a second tubular member provided adjacent one end with a portion insertable into the open end of said first tubular member and having a cylindrical bore and a concentric outwardly frusto-conical surface converging toward said one end so as to substantially conform to and have no greater angle of divergence than the inwardly frusto-conical surface of said first member when the two frusto-conical surfaces are concentrically juxtaposed, said outwardly frusto-conical surface having a circumferential groove dividing it into substantially aligned, axially spaced, frusto-conical surface portions having a common generatrix, an annular gasket seated in said groove and projecting above the top thereof, and means including a force producing connection for progressively moving said two frusto-conical surfaces concentrically toward each other to force said gasket into circumferential engagement with said inwardly frusto-conical surface intermediate its ends, the second member having its wall thickness reduced at the groove where gasket-to-metal pressure is concentrated, the material of said gasket being plastically deformable but substantially incompressible, and the volume of said gasket slightly exceeding the volume of said groove so as to provide a small percentage of said volume of gasket material that cannot be forced into the groove, said percentage being limited to permit substantially circumferential metal-to-metal contact of said two frusto-conical surfaces on both sides of said groove as said force producing connection is progressively tightened and to produce substantially complete confinement of the gasket material against displacement by a fluid pressure differential between opposite sides of the gasket.

2. A coupling assembly according to claim 1 in which said groove has parallel side walls of different depths that are normal to the tubular axis of the frusto-conical portion of said second tubular member.

3. A coupling assembly according to claim 1 in which said gasket material is tetrafluoroethylene polymerized to a tough, waxy state.

4. A tube coupling assembly for coupling an outwardly flared end of a tube to an interiorly threaded opening of a hollow body, comprising a generally tubular mandrel having a cylindrical bore and being insertable into said opening, said mandrel having an outwardly frusto-conical portion tapering toward a small end thereof for engaging the interior surface of said flared end of said tube, said frusto-conical portion having a circumferential groove therein disposed between the longitudinal center and the small end thereof and dividing the frusto-conical surface thereof into aligned and axially spaced frusto-conical surface portions having a common generatrix, an annular gasket seated in said groove, and a pressure nut externally threaded for being screwed into the interiorly threaded portion of said hollow body, said pressure nut having a cylindrical bore for surrounding said tube, said bore terminating in an outwardly flared portion providing an inner frusto-conical surface that has no greater angle of divergence than and is substantially concentric with the frusto-conical surface portions of said mandrel when axially aligned therewith for engaging the outer surface of the flared end of said tube and forcing the inner flared surface of the tube into circumferential engagement with said gasket, the tubular mandrel having its wall thickness reduced at the groove where gasket-to-metal pressure is concentrated, the material of the gasket being plastically deformable but substantially incompressible, and the volume of the gasket slightly exceeding the volume of the groove so as to provide a small percentage of said volume of gasket material that cannot be forced into the groove, said percentage being limited to permit substantially circumferential metal-to-metal contact of the interior surface of the flared end of said tube with the frusto-conical surface portions of said mandrel on both sides of said groove as said pressure nut is progressively screwed into the interiorly threaded portion of said hollow body and to produce substantially complete confinement of the gasket material against displacement by a fluid pressure differential between opposite sides of said gasket.

5. A coupling assembly according to claim 4 in which said groove has parallel side walls of different depths that are normal to the tubular axis of the frusto-conical portion of said second tubular member.

6. A coupling assembly according to claim 4 in which said gasket material is tetrafluoroethylene polymerized to a tough, waxy state.

7. A tube coupling assembly comprising a hollow body having an interiorly threaded tube receiving opening, a generally tubular mandrel having a cylindrical bore and being insertable into said opening, said mandrel having an outwardly frusto-conical portion tapering toward a small end thereof for engaging the interior surface of the flared end of a tube, said frusto-conical portion having a circumferential groove therein disposed between the longitudinal center and said small end thereof and dividing the frusto-conical surface thereof into aligned and axially spaced, frusto-conical surface portions having a common generatrix, an annular gasket seated in said groove, and a pressure nut externally threaded for being screwed into the interiorly threaded opening of said hollow body, said pressure nut having a cylindrical bore for surrounding said tube, said bore terminating in an outwardly flared portion providing an inner frusto-conical surface that has no greater angle of divergence than and is substantially concentric with the frusto-conical surface portions of said mandrel when axially aligned therewith for engaging the outer surface of the flared end of said tube and forcing the inner flared surface thereof into circumferential engagement with said gasket, the tubular mandrel having its wall thickness reduced at the groove where gasket-to-metal pressure is concentrated, the material of said gasket being plastically deformable but substantially incompressible, and the volume of the gasket slightly exceeding the volume of the groove so as to provide a small percentage of said volume of gasket material that cannot be forced into the groove, said percentage being limited to permit substantially circumferential metal-to-metal contact of the interior surface of the flared end of said tube with the frusto-conical surface portions of said mandrel on both sides of said groove as said pressure nut is progressively screwed into the interiorly threaded opening of said hollow body and to produce substantially complete confinement of the gasket material against displacement by a fluid pressure differential between opposite sides of said gasket.

8. A coupling assembly according to claim 7 in which said groove has parallel side walls of different depths that are normal to the tubular axis of the frusto-conical portion of said second tubular member.

9. A coupling assembly according to claim 7 in which said gasket material is tetrafluoroethylene polymerized to a tough, waxy state.

References Cited in the file of this patent

UNITED STATES PATENTS

| | | |
|---|---|---|
| 533,761 | Walker | Feb. 5, 1895 |
| 608,000 | Leatherman | July 26, 1898 |
| 1,782,484 | Spencer et al. | Nov. 25, 1930 |
| 1,800,753 | Replogle | Apr. 14, 1931 |
| 1,888,459 | Greve | Nov. 22, 1932 |
| 2,035,978 | Parker | Mar. 31, 1936 |
| 2,110,127 | Hinderliter | Mar. 8, 1938 |
| 2,147,254 | Hinderliter | Feb. 14, 1939 |
| 2,287,142 | Simmonds | June 23, 1942 |
| 2,307,546 | Shimer | Jan. 5, 1943 |
| 2,310,944 | Douglass | Feb. 16, 1943 |
| 2,342,422 | Morehead | Feb. 22, 1944 |
| 2,362,686 | De Lano | Nov. 14, 1944 |
| 2,381,829 | Livers | Aug. 7, 1945 |
| 2,393,967 | Brubaker | Feb. 5, 1946 |
| 2,437,632 | Wolfram | Mar. 9, 1948 |
| 2,443,394 | Le Clair | June 15, 1948 |
| 2,456,262 | Fields | Dec. 14, 1948 |
| 2,523,995 | Parmesan | Sept. 26, 1950 |

FOREIGN PATENTS

| | | |
|---|---|---|
| 244,253 | Great Britain | Dec. 17, 1925 |
| 289,902 | Great Britain | May 3, 1928 |
| 508,223 | Great Britain | June 28, 1939 |